No. 758,248. PATENTED APR. 26, 1904.
G. O. & H. E. HARBAUGH.
MACHINE FOR UNITING LOOPED FABRICS.
APPLICATION FILED AUG. 5, 1903.
NO MODEL. 5 SHEETS—SHEET 1.
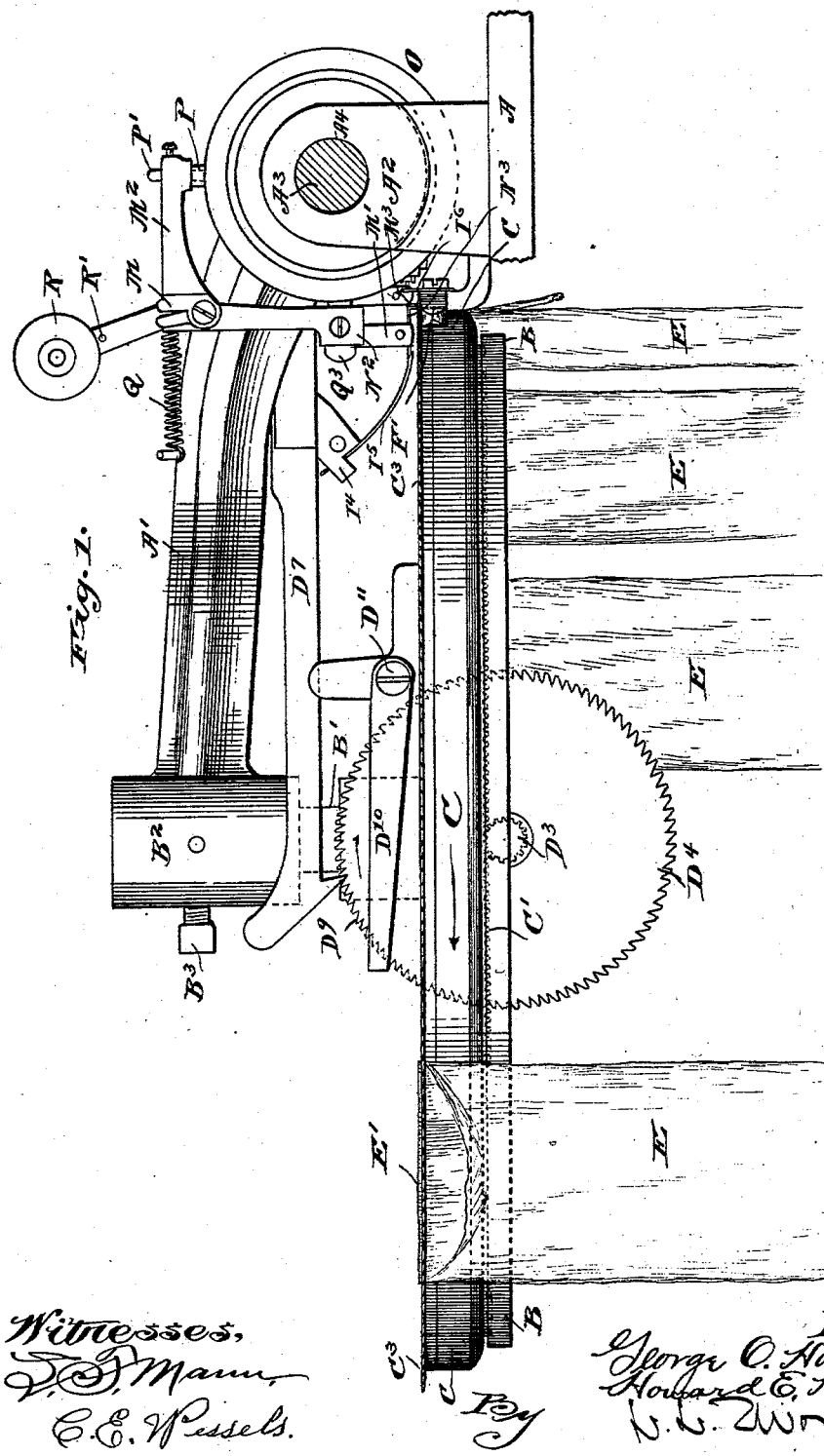

No. 758,248. PATENTED APR. 26, 1904.
G. O. & H. E. HARBAUGH.
MACHINE FOR UNITING LOOPED FABRICS.
APPLICATION FILED AUG. 5, 1903.
NO MODEL. 5 SHEETS—SHEET 2.
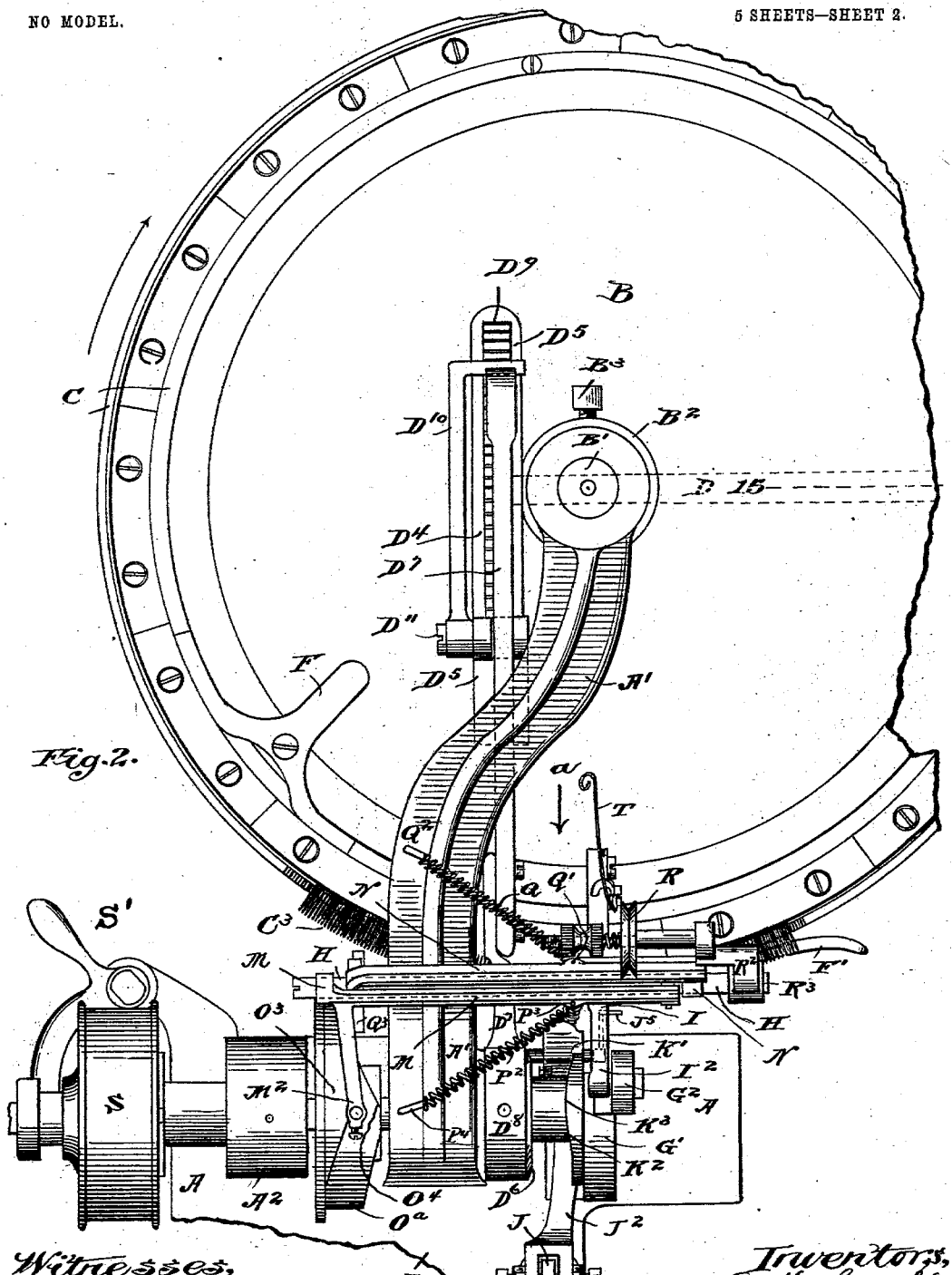

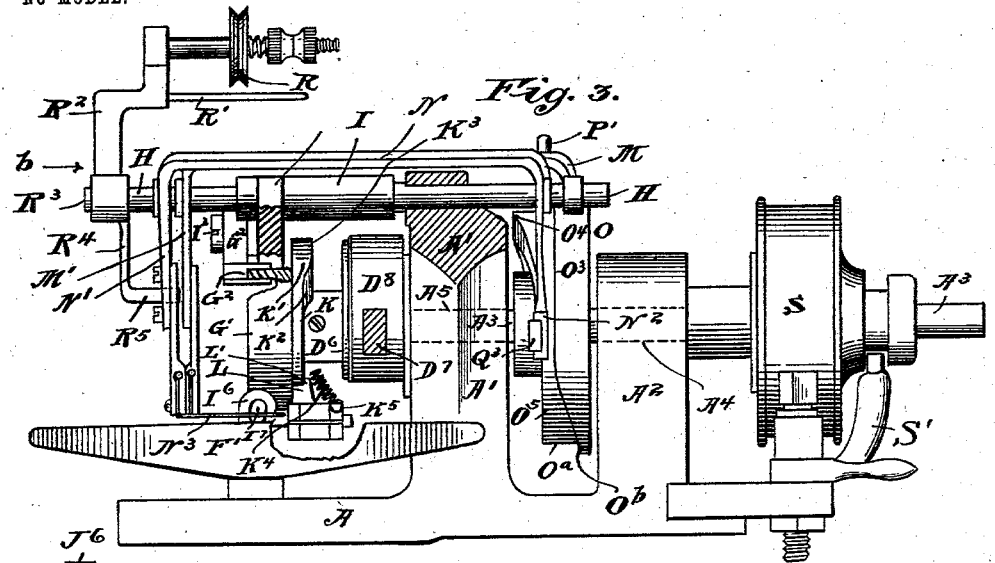
No. 758,248. PATENTED APR. 26, 1904.
G. O. & H. E. HARBAUGH.
MACHINE FOR UNITING LOOPED FABRICS.
APPLICATION FILED AUG. 5, 1903.
NO MODEL. 5 SHEETS—SHEET 3.

No. 758,248. PATENTED APR. 26, 1904.
G. O. & H. E. HARBAUGH.
MACHINE FOR UNITING LOOPED FABRICS.
APPLICATION FILED AUG. 5, 1903.
NO MODEL. 5 SHEETS—SHEET 4.
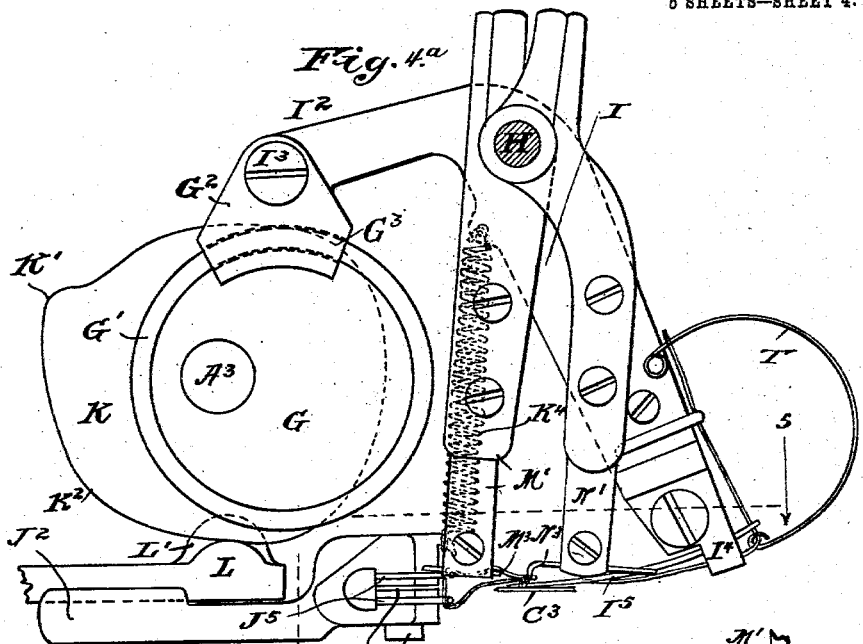
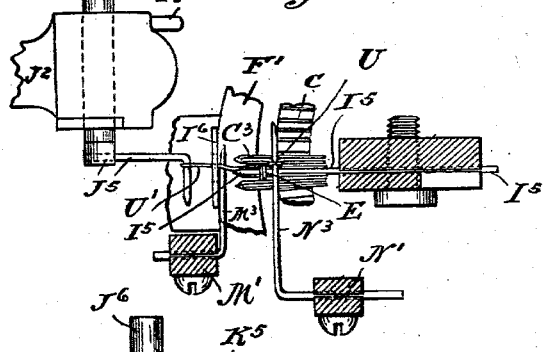
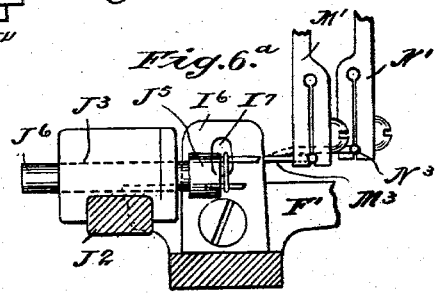
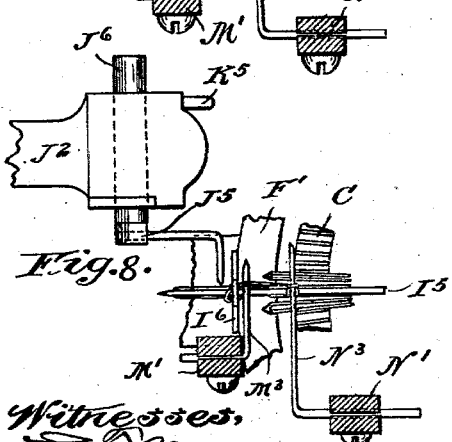
Witnesses: Inventors,
George O. Harbaugh
Howard E. Harbaugh
By
Atty.

No. 758,248. PATENTED APR. 26, 1904.
G. O. & H. E. HARBAUGH.
MACHINE FOR UNITING LOOPED FABRICS.
APPLICATION FILED AUG. 5, 1903.
NO MODEL. 5 SHEETS—SHEET 5.
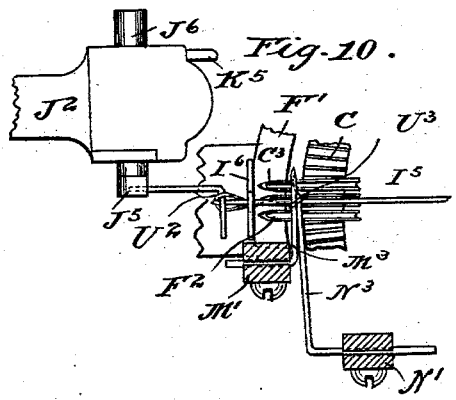
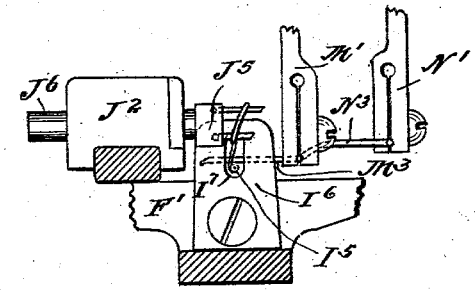
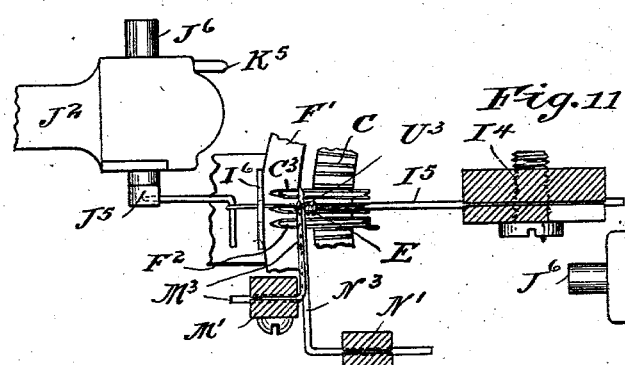
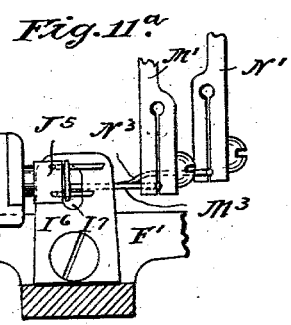
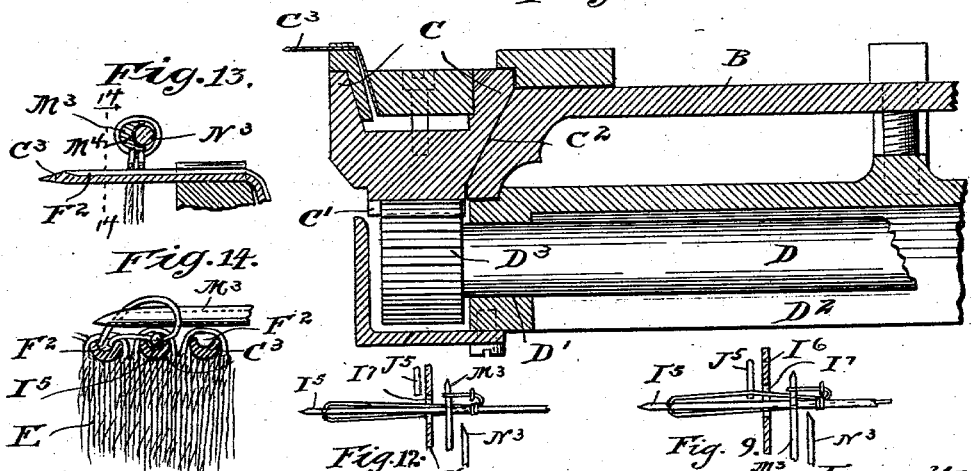

No. 758,248. Patented April 26, 1904.

UNITED STATES PATENT OFFICE.

GEORGE O. HARBAUGH AND HOWARD E. HARBAUGH, OF KENOSHA, WISCONSIN, ASSIGNORS OF ONE-THIRD TO CHICAGO-ROCKFORD HOSIERY COMPANY, OF KENOSHA, WISCONSIN, A CORPORATION OF WISCONSIN.

MACHINE FOR UNITING LOOPED FABRICS.

SPECIFICATION forming part of Letters Patent No. 758,248, dated April 26, 1904.

Application filed August 5, 1903. Serial No. 168,283. (No model.)

*To all whom it may concern:*

Be it known that we, GEORGE O. HARBAUGH and HOWARD E. HARBAUGH, citizens of the United States of America, residing at Kenosha, in the county of Kenosha and State of Wisconsin, have invented certain new and useful Improvements in Machines for Uniting Looped Fabrics, of which the following is a specification.

Our invention relates to machines for uniting the selvage edges of looped or knit fabrics to produce therefrom underwear, hosiery, &c.

We accomplish our invention by devising mechanism that will unite such selvage edges by means of looser, more open, and consequently more elastic stitches than those heretofore employed for that purpose. In fact, the elasticity of the stitches formed by this machine approximate the elasticity of the fabrics which it is proposed to unite thereby.

Our invention consists of certain new and useful features of construction and combinations of parts especially devised and designed to produce the improved uniting means hereinbefore referred to, all as hereinafter fully described, and specifically pointed out in the claims.

Referring to the accompanying drawings, which form a part of this specification, Figure 1 is a side elevation of a machine embodying our improvements. Fig. 2 is a top plan view of the same. Fig. 3 is a view of an elevation of the rear portion of the machine as seen at the arrow $a$ in Fig. 2, the front portion of the machine being broken away. Fig. 4 is an end view of parts of the machine shown in Fig. 3, as seen at the arrow $b$ in Fig. 3, with other parts added and sectioned. Fig. $4^a$ is an enlarged detail view of parts shown in Fig. 4, with some parts thereof in different positions from those there shown. Figs. 5 to 8, inclusive, and Figs. 10 and 11 are top plan views with parts sectioned away through the dotted line 5 in Fig. $4^a$, illustrating the successive operations of the needle, loop-transferrer, stitch-receiver, and some coöperating parts of the machine while forming a stitch. Figs. $6^a$, $8^a$, $10^a$, and $11^a$ are views in elevation with parts sectioned away through the dotted line $6^a$ in Fig. $4^a$ of parts shown in Figs. 6, 8, 10, and 11. Fig. 9 is a top plan view of the needle, loop-transferrer, and stitch-receiver of the machine with some coöperating parts. Fig. 12 is a like view of the same parts, some of which are in slightly-different positions. Figs. 13 and 14 are enlarged sectional details of the loop-transferrer, stitch-receiver, and some of the impaling-quills of the machine. Fig. 15 is a section at the dotted line 15 in Fig. 2 of parts there shown.

Like letters of reference indicate corresponding parts throughout the several views.

$A$ $A'$ $A^2$ are a base, an arm, and a vertical post formed, preferably, in a single piece by casting.

$A^3$ is the main shaft of the machine and is mounted in bearings $A^4$ $A^5$, Figs. 1 and 3, in the parts $A$ $A'$.

B is a circular bearing-plate and is adjustably suspended by means of an integral stem $B'$ thereon from a socket $B^2$ in the free end of the arm $A'$, whereinto it is rigidly secured by the set-screw $B^3$.

C is an annular work-holder having a circular rack $C'$, Fig. 1, formed on the under side thereof and rotatably mounted on a ledge $C^2$, Fig. 15, on the bearing-plate B and provided with a series of pointed metal impaling-quills $C^3$, projecting radially from the periphery thereof around its entire circumference to receive and support pieces of knit fabric while being united together.

D, Fig. 15, is a shaft mounted in two identical bearings $D'$ (one only being shown) in the shaft-housing $D^2$, which is rigidly secured to and depends from the under side of the bearing-plate B.

$D^3$ is a pinion mounted fast on the shaft D and meshing with the rack $C'$ on the work-holder C.

$D^4$, Fig. 1, is a ratchet-wheel mounted fast on the shaft D and projecting upward through an opening $D^5$, Fig. 2, in the bearing-plate B.

$D^6$, Figs. 2 and 3, is an eccentric mounted fast on the shaft $A^3$.

$D^7$, Fig. 2, is a pallet connected at one end by means of the eccentric-strap $D^8$ with the eccentric $D^6$ and fashioned at its free end to adapt it to engage the teeth $D^9$, Fig. 1, of the ratchet-wheel $D^4$, and therethrough drive the same.

$D^{10}$ is a detent mounted on a pivot-bearing $D^{11}$ and serving to lock the ratchet-wheel $D^4$ to prevent it from rotation in one direction.

E, Figs. 1 and 4, represent stockings open at their toe ends as they came from the knitting-machine, so impaled on the quills $C^3$ that the selvage edges $E'$ of the toe portions thereof are parallel, contiguous, and ready to be united by the sewing devices of the machine.

F, Fig. 2, is a cast spider rigidly secured to the bearing-plate B and frictionally contacting the work-holder C to prevent its too easy rotation.

$F'$, Figs. 1, 2, and 3, is a work-guide curved to substantially coincide with the periphery of the work-holder C, rigidly secured to the machine-base A and serving both to maintain the work in proper position on the impaling-quills $C^3$ and to support the outer ends of such quills while the needle of the sewing mechanism of the machine is traversing the longitudinal grooves $F^2$, Figs. 13 and 14, therein in passing back and forth with its thread through the pieces of fabric to unite them.

The parts hereinbefore described constitute for the most part the carriage or work-holder and its support for receiving the pieces of fabric to be united and mechanism for presenting the same to and retiring them from the sewing devices of the machine.

G, Fig. $4^a$, is an eccentric disk mounted fast on the shaft $A^3$ and provided with an integral transverse circular flange $G'$.

$G^2$ is a shoe having a groove $G^3$ therein, admitting, coinciding with, and freely traversable by the flange $G'$ of the disk G.

H, Fig. 3, is a rigid cylindrical rod mounted fast in the arm $A'$ of the machine.

I, Fig. $4^a$, is a needle-bar pivotally mounted at its middle portion on the rod H and connected at its upper end $I^2$ by means of a pivot $I^3$ with the upper portion of the shoe $G^2$ and provided at its lower end $I^4$ with a curved sewing-needle $I^5$, secured therein.

$I^6$, Fig. $6^a$, is a combined guide and gage plate having a transverse thread-opening $I^7$ therein and rigidly secured to the outside of the guide $F'$.

J, Fig. 4, is a bearing-post pivotally mounted in the socket $J'$ on the base A.

$J^2$ is a looper-arm pivotally mounted by one end to the bearing-post J and provided at its free end with a transverse split bearing $J^3$, Fig. $4^a$, adjustable by means of a clamp-screw $J^4$.

$J^5$ is a looper, preferably two-fingered, as shown, provided with a supporting-wrist $J^6$, adjustable and seated in the split bearing $J^3$ in the looper-arm $J^2$.

K, Fig. $4^a$, is a compound cam-wheel mounted fast on the shaft $A^3$, the periphery thereof being cam-shaped and its maximum eccentricity extending between the points $K'$ $K^2$ thereon, the inner face thereof also having developed thereon a horizontal flange-cam $K^3$, Fig. 2, also extending between the points $K'$ $K^2$ thereon.

$K^4$, Fig. 4, is a tension-spring connecting the free end of the looper-arm $J^2$ through the lug $K^5$ thereon with a lug $K^6$ on the needle-bar I and serving to maintain the lug L, Figs. 3 and 4, on the looper-arm $J^2$ in constant engagement with the periphery of the cam-wheel K and also serving to maintain the lip $L'$ on the lug L in the path of the cam $K^3$ thereon.

M, Figs. 1, 2, and 3, is a loop-transferrer carriage slidably mounted on the rod H and terminating at one end in a downwardly-projecting loop-transferrer bar $M'$ and at the other end in a backwardly-projecting arm $M^2$.

$M^3$ is a loop-transferrer secured into the lower end portion of the loop-transferrer bar $M'$. The free end portion of the loop-transferrer $M^3$, Fig. 13, has a longitudinal groove $M^4$ therein to provide a slideway and ensconcing-recess for the admission of the free end portion of the part next hereinafter to be described.

N is a stitch-receiver carriage slidably mounted on the rod H and terminating at one end in a downwardly-projecting stitch-receiver bar $N'$ and at the other end in a downwardly-projecting arm $N^2$.

$N^3$ is a stitch-receiver secured into the lower end portion of the stitch-receiver bar $N'$ and having its free end portion adapted to slide in the longitudinal groove $M^4$ in the loop-transferrer $M^3$, Fig. 13.

O, Figs. 1 to 4, is a compound cam-wheel mounted fast on the shaft $A^3$, a portion of the operative periphery $O^a$ thereof being cam-shaped and its maximum eccentricity extending between the points $O'$ $O^2$, Fig. 4, thereon, the inner face thereof also having developed thereon horizontal flange-cams $O^3$ $O^4$, Figs. 2 and 3, the former extending about halfway and the latter about one-third of the way around the circumference of such cam-wheel O.

P, Figs. 1 and 4, is a roller-stud mounted on a vertical pintle-bearing $P'$, adjustably seated in the free end portion of the arm $M^2$ of the slidable loop-transferrer carriage M.

$P^2$, Fig. 2, is a tension-spring fast by its ends to fixed bearings $P^3$ $P^4$ on the parts $A'$ M and serving to maintain the roller-stud P, Fig. 4, in constant engagement with the working periphery $O^a$ and the cam $O^3$, Figs. 2, 3, and 4, or the inner face $O^b$ of the cam-wheel O.

Q, Fig. 2, is a tension-spring fast by its ends to fixed bearings $Q'$ $Q^2$ on the parts $A'$ N and serving to maintain one side of the horizontal arm $Q^3$, Figs. 1, 2, and 3, rigidly secured to and projecting from the arm $N^2$, in constant engagement with the cam $O^4$, Fig. 3, or the depressed portion $O^5$ thereof.

R $R'$, Figs. 3 and 4, are a thread-tension and guide supported by an arm R², adjustably secured to one end of the rod H by means of a screw R³.

R⁴ is an arm integral with the arm R², having a horizontal member R⁵ projecting past the part N' and serving as an adjustable stop therefor.

S is a driving-pulley and S' its shifting-lever. T is a thread take-up.

At each rotation of the shaft A³ the following operations take place: The eccentric D⁶, Figs. 2 and 3, acting through the pallet D⁷, ratchet-wheel D⁹, shaft D, Fig. 15, pinion D³, and rack C', rotates the work-holder C to the extent of the distance between the points of any two adjacent impaling-quills C³ thereon. The flange G', Fig. 4ᵃ, of the eccentric disk G, acting through the shoe G² and the needle-bar I, drives the needle I⁵ back and forth lengthwise of the groove F², Figs. 13 and 14, in the impaling-quills C³ through one complete vibration thereof. The compound cam K' K², Fig. 4ᵃ, of the cam-wheel K, acting upon the lug L and its lip L' and through the looper-arm J², causes the looper J⁵ to pass obliquely forward and upward and take a loop from the needle I⁵, Figs. 9 and 11, as such needle is finishing its backward stroke, and on its next forward stroke the needle will pass through the loop just formed, Fig. 7. Then the looper J⁵ will pass obliquely backward and downward to the position from whence it started, Figs. 6 and 12, and be in readiness to repeat the operations just described, beginning as in Fig. 9. The tension-spring K⁴ serves to maintain the parts L L' in constant engagement with the compound cam-wheel K. The flange-cams O³ O⁴, Fig. 3, of the cam-wheel O, coöperating with the tension-springs P² Q, slide the carriages M N, with their loop-transferrer M³ and stitch-receiver N³, alternately back and forth on the rod H. The cam Oᵃ, also of the cam-wheel O, acting through the arm M² and carriage M, gives the free end of the arm M² and its loop-transferrer M³ a pendulum-like movement in the directions indicated by the double arrow in Fig. 5. (See also Fig. 7, where the loop-transferrer M³ is shown at the outer limit of its vibration in a direction opposite to that shown in Fig. 5.)

Keeping in mind the functions of each of the moving parts carried by the shaft A³, the operation of the machine to form an open and elastic stitch, such as is contemplated by our invention, is as follows: Fig. 4 shows the machine in readiness for sewing. Fig. 5 shows a top plan view of the needle, loop-transferrer, and stitch-receiver of the machine after the main shaft A³ has made one complete revolution and returned all the parts operated thereby to the positions shown in Fig. 4, a complete stitch having been formed by the operations just predicated, with its enlarged stitch-loop U still remaining on the stitch-receiver N³. Fig. 6 is a view of the same parts with the needle I⁵ advanced to the free end of the impaling-quill C³, located immediately thereunder, and with the loop-transferrer M³ swung over against the plate I⁶ and then passed through the loop U' preparatory to receiving it from the looper J⁵ and transferring it therefrom to form a second stitch-loop like U. Fig. 7 shows the needle I⁵ advanced from the position shown in Fig. 6 part way through the loop U'. Fig. 8 shows the needle I⁵ advanced from the position shown in Fig. 7 to the forward limit of its travel and the looper J⁵ pressed downward and backward to its farthest limit and ready to take another loop of thread from the needle I⁵. Fig. 9 shows the looper just in the act of taking a loop from the needle I⁵. Fig. 10 shows the needle I⁵ after it has deposited a loop U² on the looper J⁵ and is just withdrawing from such loop. Fig. 10 also shows the loop-transferrer M³ swung from the positions shown in Figs. 8 and 9 (the latter being an intermediate position) over against the stitch-receiver N³, which is just in the act of receiving a stitch-loop U³ from the loop-transferrer M³ by sliding along the groove M⁴ in the latter and passing thence through such stitch-loop U³. Fig. 11 shows the loop-transferrer M³ after it has transferred the loop U³ to the stitch-receiver N³ and is just withdrawing from such loop U³. Fig. 5 shows the stitch-receiver N³ a second time at its inner limit of travel with a second complete enlarged elastic stitch-loop U thereon and with the loop-transferrer M³ ready to swing a second time over against the plate I⁶ and then slide a second time, Fig. 6, through a loop U'.

Recapitulating briefly: The loop-transferrer M³ receives a loop from the looper J⁵, transfers it to the stitch-receiver N³, around which it is drawn taut by the needle I⁵ and the thread-tension devices of the machine, thereby forming an enlarged stitch-loop U, the size of which is obviously determined by the diameter of the stitch-receiver N³. If very open, loose, and consequently very elastic stitches are required, as when the fabrics to be united are very elastic, a correspondingly large and coarse loop-transferrer M³ and stitch-receiver N³ must be employed, and vice versa. The sole function of the transferrer M³ is to transfer each stitch-loop from the looper J⁵ to the receiver N³. While the loop U, Fig. 5, was very loose and still on the loop-transferrer M³ the stitch-receiver N³ was thrust endwise in the manner already described through such loop U, and immediately thereafter the needle I⁵, traveling backward, drew such stitch-loop U' tightly thereover. During the operations just described the loop-transferrer M³ traveled backward out of engagement with the stitch-loop U and is in readiness to swing over against the plate I⁶, Fig. 7, and take another loop U' from the looper J⁵. The stitch-receiver N³ is always at rest while a stitch U is being formed thereon, a circumstance that insures both uniform-sized and well-formed stitches for uniting looped, knit, or other fabrics.

What we claim as our invention, and desire to secure by Letters Patent, is—

1. In a machine for uniting knit fabrics, in combination, fabric-impaling quills, a sewing-needle, a looper, a stitch-receiver, a loop-transferrer—for transferring each stitch-loop from the looper to the stitch-receiver—and means for supporting and operating all of said parts, substantially as and for the purpose specified.

2. In a machine for uniting knit fabrics, in combination, fabric-impaling quills having longitudinal grooves in the upper sides thereof, a sewing-needle adapted to travel back and forth in the grooves in the impaling-quills, a looper, a stitch-receiver, a loop-transferrer—for transferring each stitch-loop from the looper to the stitch-receiver—and means for supporting and operating all of such parts, substantially as and for the purpose specified.

3. In a machine for uniting knit fabrics, in combination, fabric-impaling quills having longitudinal grooves in the upper sides thereof, a sewing-needle adapted to travel back and forth in the grooves in the impaling-quills, a looper, means for supporting such impaling-quills sewing-needle and looper, a stitch-receiver and a loop-transferrer—for transferring stitch-loops from the looper to the stitch-receiver—carriages for supporting such stitch-receiver and loop-transferrer, and means for operating all of said parts, substantially as and for the purpose specified.

4. In a machine for uniting knit fabrics, in combination, fabric-impaling quills, a sewing-needle, a looper, means for supporting such impaling-quills sewing-needle and looper, a stitch-receiver and a loop-transferrer—for transferring stitch-loops from the looper to the stitch-receiver—carriages for supporting such stitch-receiver and loop-transferrer, cams for driving such carriages, and means for operating such cams and other parts of said machine, substantially as and for the purpose specified.

GEORGE O. HARBAUGH.
HOWARD E. HARBAUGH.

Witnesses for George O. Harbaugh:
H. L. EICHELMAN,
F. C. GLIDDON.

Witnesses for Howard E. Harbaugh:
G. H. CURTIS,
S. P. BUTCHER.